May 29, 1956  J. H. GEULA  2,747,337
AUTOMATIC EDGE GRINDER FOR OPTICAL LENSES
Filed Sept. 2, 1953  5 Sheets-Sheet 1

INVENTOR.
JOHN H. GEULA
BY
ATTORNEY

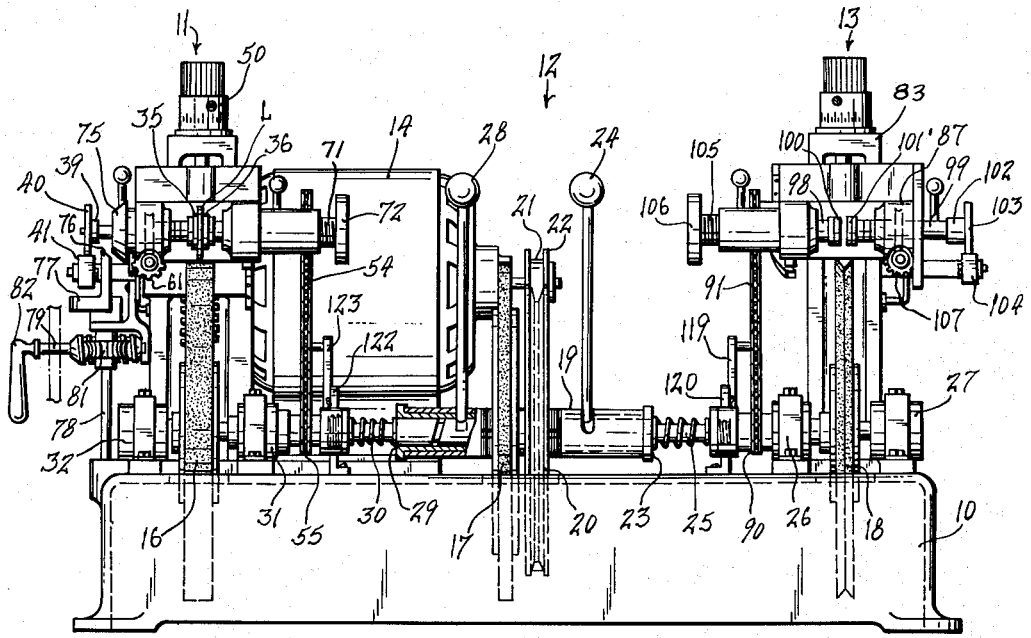

INVENTOR.
JOHN H. GEULA
ATTORNEY

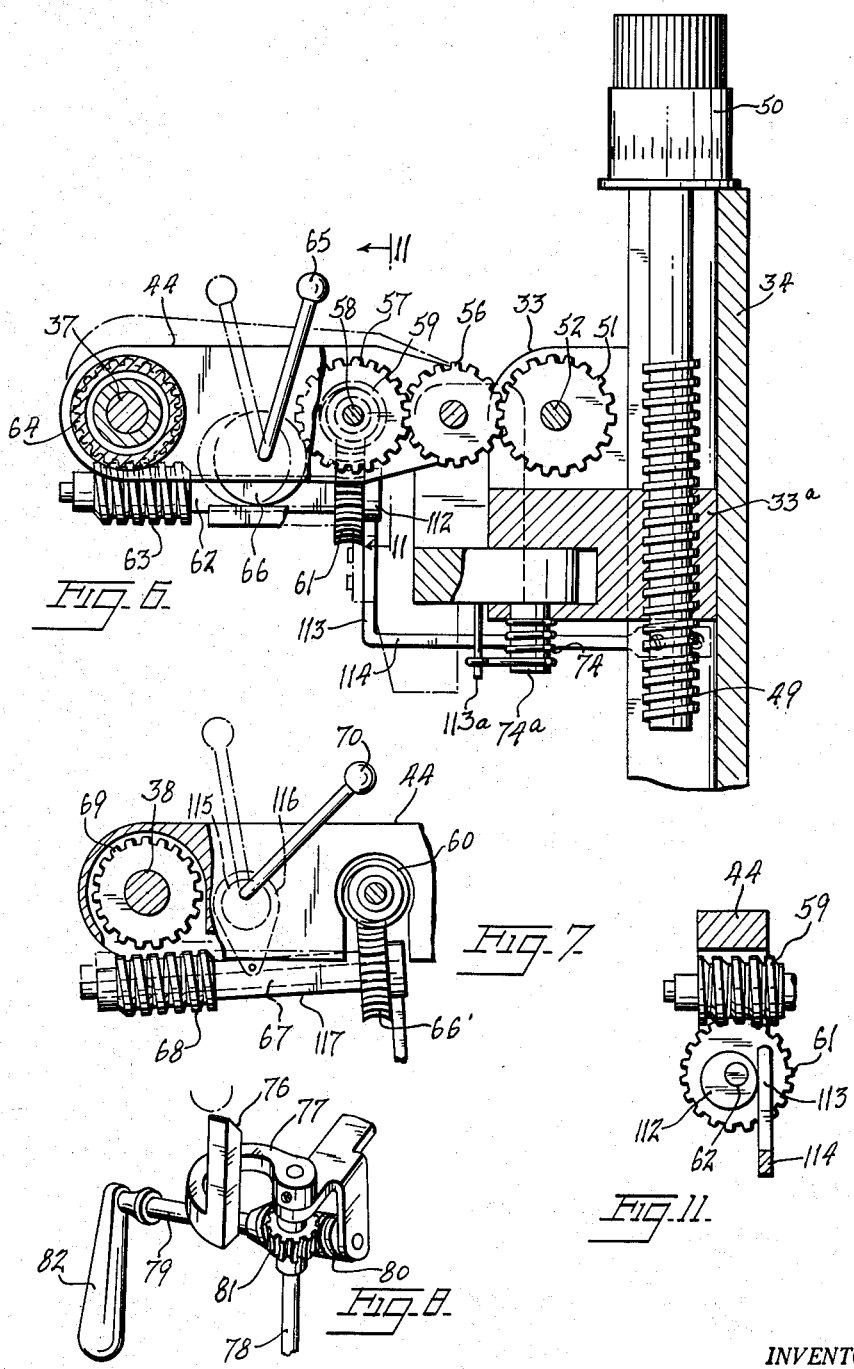

May 29, 1956　　　J. H. GEULA　　　2,747,337
AUTOMATIC EDGE GRINDER FOR OPTICAL LENSES
Filed Sept. 2, 1953　　　　　　5 Sheets-Sheet 5

INVENTOR.
JOHN H. GEULA
BY
ATTORNEY

United States Patent Office 2,747,337
Patented May 29, 1956

2,747,337
AUTOMATIC EDGE GRINDER FOR OPTICAL LENSES

John H. Geula, New York, N. Y.

Application September 2, 1953, Serial No. 378,045

7 Claims. (Cl. 51—101)

This invention relates to new and useful improvements in machines for forming the contours of articles and has particular reference to a machine for grinding the edges of optical lenses whether of disc or other shape.

While the invention may be employed for grinding the edges of plates made of any material such as metal, it is especially applicable to optical lenses and other glass plates, such as watch glasses, windows of eye goggles and similar articles. The machine is applicable to bevel edge grinding of the lens as well as to flat edge grinding thereof and the machine is adapted to form the contour of lenses of various kinds whether of the flat disc type or the concave type, and whether of round, oval, octagonal or any desired shape.

The great diversity of styles in modern day spectacles makes it essential for the optician to be able to grind the edges of optical lenses of various shapes and sizes. Where the lens is intended for insertion in a protective frame, it is customary to bevel the periphery of the lens so that it may be fitted within a suitable groove in the frame. For rimless glasses, flat grinding of the lens edge is usually required. Thus an optician normally makes use of separate automatic machines for bevel and flat grinding operations. In addition, a machine for hand grinding is entailed in order to touch up results produced by the automatic machines. These three machines represent a considerable financial investment for the optician and necessarily occupy a great deal of floor space in the optician's shop. Where a mobile lens grinding installation is called for, such as the mobile truck units employed in the optical sections of the military services, the space requirements of existing machines are a serious drawback to mobility.

Accordingly, it is the principal object of the invention to provide an improved machine for grinding the edges of lenses and in particular to provide a mechanism whereby a uniform flat surface or bevel may be formed along the edge of a lens of any contour or configuration.

Another object of the invention is to provide a machine of this character which will bevel or flat grind not only lenses of different shapes but also lenses of different sizes, the machine being readily adjustable to the different sizes.

A more specific object of the invention is to provide a lens edging machine wherein the lens is automatically disengaged from the grinding stone by a positive lift action upon completion of grinding to a predetermined contour.

The machine of the present invention is further characterized by the fact that its operation is fully automatic after having been preset to conform its operation to the shape of the particular lens to be ground. Thus, operation of the machine is simple and requires no special skill on the part of the operator beyond a simple knowledge of how to preset the machine.

Yet another object of the invention is to provide a multiple-purpose machine having a common motor for selectively driving three grindstone devices, one device being adapted for automatic bevel edging, the other for automatic flat edging, and the third for hand operation. The multiple-purpose machine is further characterized by simplicity and compactness of design, affording an all-purpose edging mechanism which conserves valuable space and is of economical construction. A machine in accordance with the invention is efficient for its intended purpose and may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 3 is a front elevation of the machine.

Fig. 4 is a side elevation as viewed from the left-hand side of the machine.

Fig. 6 is an enlarged sectional view taken through the lines 6—6 of Fig. 1.

Fig. 7 is a separate detail of the gear mechanism for driving the spindle.

Fig. 8 is a separate detail of the mechanism for automatically lifting the lens from the grinding wheel when the edge is completed.

Fig. 11 is a view taken along lines 11—11 in Fig. 6.

Figure 1:
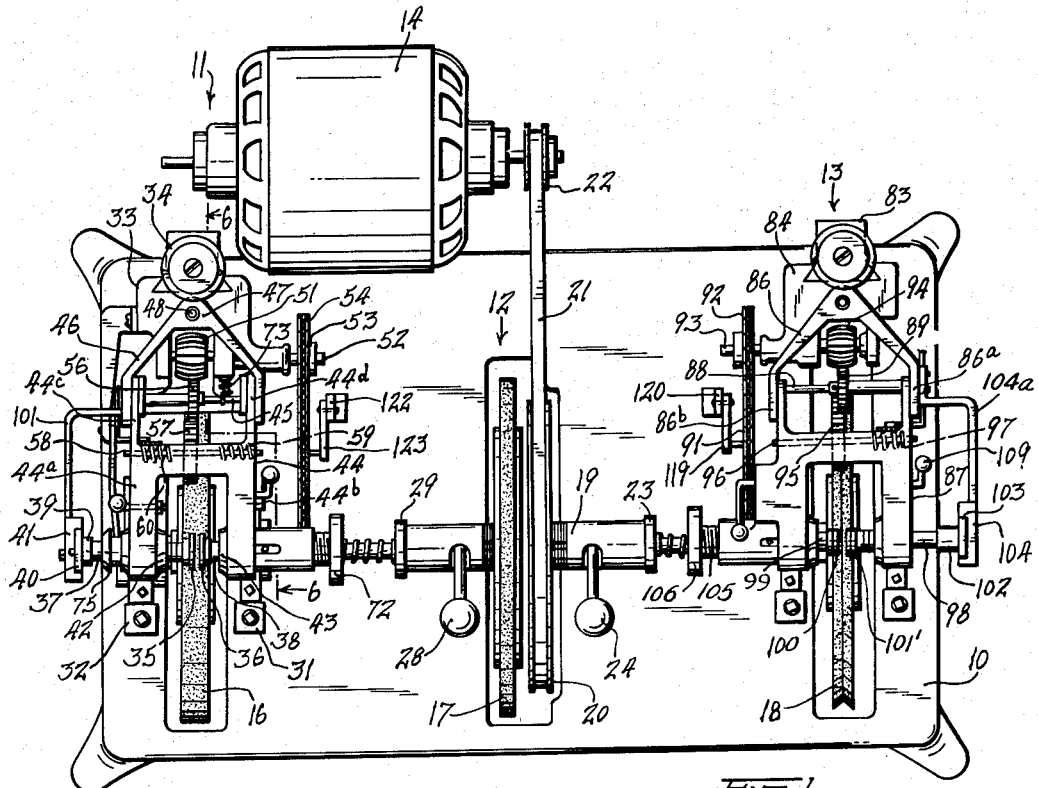
Fig. 1 is a top plan view of a machine in accordance with the present invention.

Referring now to the drawings wherein like reference characters designate like parts throughout the several views, the machine embodying the invention broadly comprises a pedestal bed 10 having mounted at spaced positions thereon three grinding sections; namely, an automatic flat edge grinding section 11, a manual grinding section 12 and an automatic bevel edge grinding section 13.

Motive power for all three sections is provided in the form of an electric motor 14 supported on a bracket 15 attached to the rear wall of bed 10. Section 11 includes an abrasive grinding stone 16 having a relatively wide peripheral surface, while section 12 includes a similar flat grinding stone 17. Section 13 is furnished with a grinding stone 18 having a V-shaped double-faced periphery for forming a bevel edge on the contour of an optical lens. All three stones are rotatably mounted in axial alignment.

As shown in Figs. 1 and 3, power for the rotation of stone 17 is applied to a shaft 19, on which the stone is mounted, through a pulley 20 affixed to the sameshaft and connected by a drive belt 21 to a smaller pulley 22 connected to the end of the shaft on motor 14. In order to drive grinding stone 18, a friction clutch 23 is provided which is actuated by a lever 24 so as to effect coupling between shaft 19 and the shaft 25 on which stone 18 is secured, shaft 25 being journalled in suitable bearings 26 and 27. Similarly, grinding stone 16 is set into motion by shifting a lever 28 which actuates a friction clutch 29 affecting coupling between shaft 19 and the shaft 30 on which stone 16 is rotatably supported, shaft 30 being journalled in bearings 31 and 32. These friction clutch arrangements will permit ready connection or disconnection of the corresponding grinding stones. They will also permit easy replacement of the grinding stones.

Figure 5:
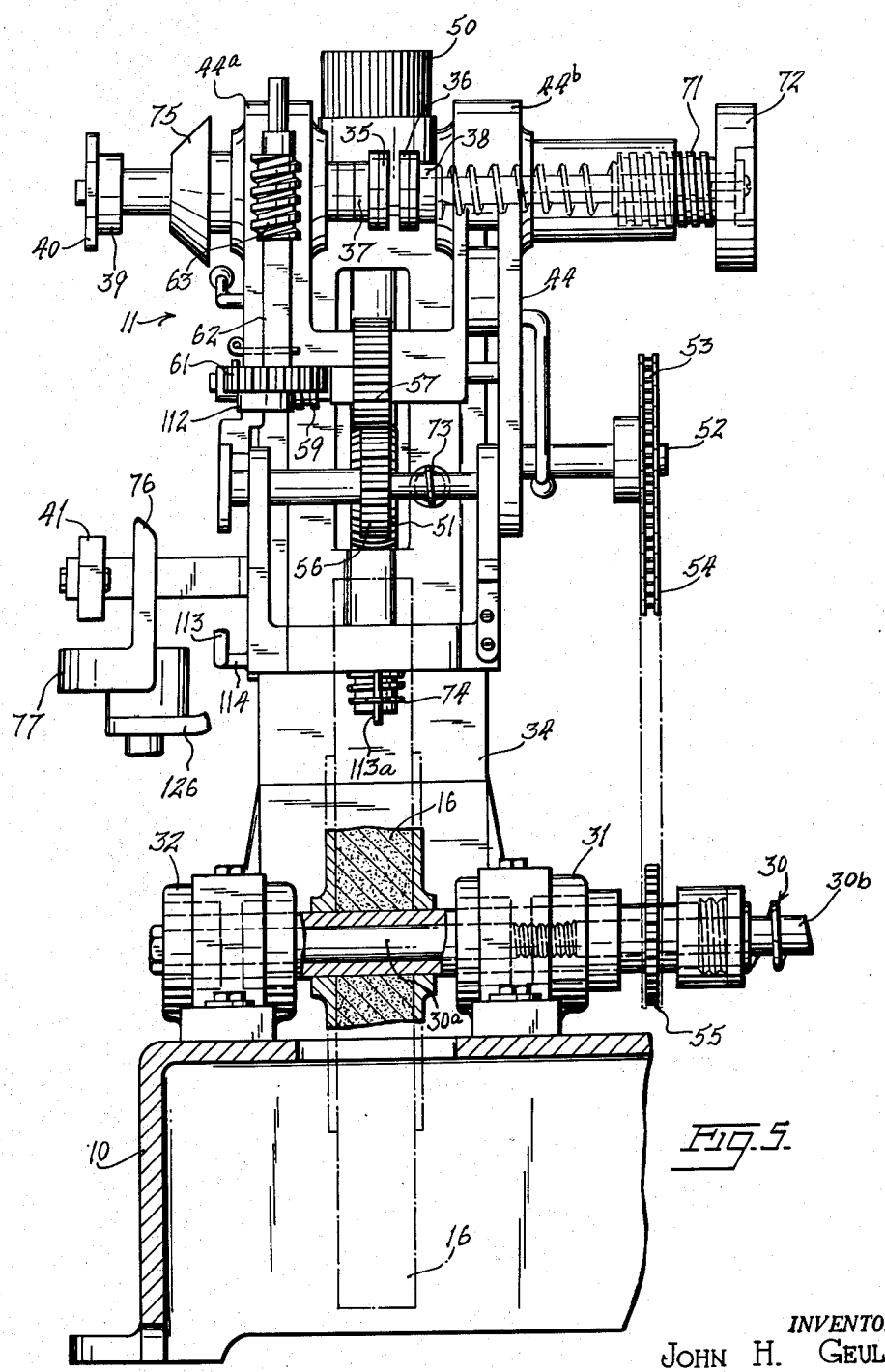
Fig. 5 is an enlarged front elevation of the flat grinding section of the machine with the pivoted lens holder lifted vertically away from the grinding stone.

In order to permit the removal and replacement of stone 16 from the machine, shaft 30, as best seen in Fig. 5, is constituted by threadably coupled sections 30a and 30b, such that stone 16 which is affixed to section 30a may be detached from the machine bearings without disturbing shaft section 30b and the elements coupled thereto. A similar expedient may be used with the shaft 25 for stone 18.

As previously explained, grinding stone 17 is intended for manual operation to touch up a lens already ground in one of the automatic sections or it may be used for other special manual operations. Consequently, no lens holder is provided in conjunction with stone 17 to control automatically the position of the lens edge with respect to the grinding surface of the stone. The other two grinding stones each function in cooperation with a lens holding structure which is adapted to orient the lens relative to the grinding stone and at the same time axially to rotate the lens slowly in order to effect a grinding action on the edge thereof about its entire periphery. The lens holding structure is arranged to hold the optical lens against the associated grinding stone and to permit the lens to move vertically or radially as portions of the lens at different distances from the axis of revolution thereof are presented to the grinding surface and to swing laterally or axially as different portions of the edges of toric, cylindrical or other concave or convex lenses having different planes make contact with the grinding surface.

We shall first describe the details of the automatic flat grinding section 11, which is designed to orient a lens for flat edge grinding on rotating stone 16 and to revolve the lens slowly until it is ground to the desired contour determined with reference to a master former, at which point the lens is automatically withdrawn from the surface of the stone. While the lens is revolved slowly the lens is also oscillated in the sidewise direction to form a uniformly flat edge thereon.

As is best seen in Figs. 1, 4, 5 and 6, section 11 comprises a carriage 33 which is movably supported for longitudinal movement on a vertical column 34 whose base is secured to bed 10. A lens L to be ground (shown only in Fig. 3) is supported edgewise vertically between clamping heads 35 and 36 having face pads thereon formed of rubber or similar material to prevent damage or scratching of the lens while maintaining a tight grip on the lens. Heads 35 and 36 are mounted end to end upon coaxially disposed rotary spindles 37 and 38. Spindles 37 and 38 in turn are journalled in suitable bearings 42 and 43 supported on opposing horizontal front arms 44$^a$ and 44$^b$ projecting from a rocker frame 44 having rear arms 44$^c$ and 44$^d$ which are pivotally coupled by an axle 45 to the downwardly extending side pieces of a V-shaped yoke 46. The apex 47 of yoke 46 is pivoted for oscillation in the horizontal plane by a pin 48 connecting yoke 46 to the top wall of carriage 33. Thus yoke 46 may be rocked sidewise, thereby shifting optical lens L transversely across the surface of stone 16, whereas frame 44 is swingable vertically on yoke 46 whereby the lens may ride up and down with respect to stone 16 in accordance with a desired contour.

Secured to the other end of spindle 37 is a chuck 39 adapted to hold a master plate or former 40 having a predetermined size and a contour of the desired shape to which the lens edge is to be conformed. As best seen in Fig. 4, the edge of former 40 rests on a horizontally disposed block or shoe 41 which is affixed to the free end of an L-shaped extension 101 connected to a vertical plate 125 whose upper end depends from axle 45 and whose lower end is supported by a bracket 126 attached to carriage 33. The arrangement is such that as former 40 rotates, its edge contacts shoe 41, thus guiding the simultaneously rotating lens and causing it to be ground to the desired contour and size.

As shown separately in Fig. 6, column 34 is of hollow construction and houses a worm-threaded shaft 49 which is manually rotatable by means of a vernier dial 50. Carriage 33 is provided with a flange 33$^a$ which extends into a longitudinal slot in column 34 and has an internally threaded bore to receive worm 49, whereby rotation of the worm causes the carriage to advance up or down the column. This enables adjustment of the lens holder to a desired height relative to grinding stone 16.

Rotatably mounted between opposing projections on carriage 33 is a gear 51 secured to the center of a cross-shaft 52 which is journalled in suitable bearings on the projections. The right-handed end of shaft 52 is extended laterally from carriage 33 and is terminated in a sprocket wheel 53. Sprocket wheel 53 is linked by a chain belt 54 to a similar sprocket wheel 55 keyed to grinding stone shaft 30 for simultaneous rotation therewith.

As shown in Figs. 6 and 7, the motion of gear 51 is transmitted to spindle 37 for rotating head 35 and to spindle 38 for rotating head 36. This is accomplished by a reduction gear train including gear 56 which is keyed to cross axle 45 and meshes on one side with gear 51 and on the other side with a gear 57 centrally secured to a shaft 58 whose ends are journalled in suitable bearings on frame 44. On either side of gear 57, the shaft 58 has secured thereto a worm 59 and a worm 60. Worm 59 engages a perpendicularly disposed gear 61 secured to the end of a shaft 62 carried by yoke 46 whose other end terminates in a worm 63 which meshes with a gear 64 secured to spindle 37. As will be seen in Fig. 1, the surface of gear 51 is broad and somewhat curved so that when the yoke 46 is swung to either side, gear 56, which is thinner than gear 51, is maintained in meshing relation therewith.

In order to oscillate yoke 46 during the grinding operation so as to obtain a uniform edge, an eccentric cam 112 is attached on shaft 62 to the rear of gear 61, the cam engaging a vertical post 113 secured by a horizontal arm 114 to carriage 33. As cam 112 rotates, the yoke 46 is caused to oscillate in the horizontal plane.

To disengage worm 63 from gear 64, a lever 65 is provided which is attached to and rotates an eccentric cam 66 disposed so as to force shaft 62 downwardly when the lever is raised, thereby decoupling worm 63 from gear 64. Similarly, worm 60 meshes with perpendicularly disposed gear 66' secured to the end of a shaft 67 whose other end terminates in a worm 68 engaging a gear 69 keyed to spindle 38. Disengagement is effected by means of a lever 70 extending from an eccentric element 115 rotatably mounted on frame 44 and received within the openings of a wedge-shaped lug 116 whose apex is pivoted to a bushing 117 through which shaft 67 extends. When lever 70 is raised, eccentric element 115 causes lug 116 to force shaft 67 downwardly to disengage worm 68 from gear 69. Thus as the stone 16 is driven by motor 14, when the levers 65 and 70 are lowered, the spindles 37 and 38 are simultaneously rotated but at a greatly reduced rate with respect to the revolutions of stone 16, by reason of the particular gear arrangement.

Spindle 38 is slidable axially in its bearing to force the associated lens clamping head 36 against the lens and thereby clamp the lens L against head 35. For this purpose, a threaded rod 71 is provided which is received within the bearing for spindle 38 and serves to push the spindle inwardly, the rod being turned by a knurled knob 72.

There is provided a tension spring 73 (Fig. 1) which connects cross-shaft 45 to a fixed point of carriage 33, the spring being offset from the center of the shaft so that it normally tends to swing the yoke 46 toward the right about its pivot 48. A torsion coil spring 74 (Fig. 6) is mounted on a peg 74$^a$ projecting below the carriage 33. The free end of the spring 74 connects with a pin 113$^a$ secured to and projecting below yoke 46. The spring 74 tends to counteract the force of spring 73 and to urge yoke 46 toward the left.

Spring 74 is somewhat more powerful than spring 73 and more than overcomes the tendency of spring 73 to swing yoke 46 to the right. However, as long as the lens L lies in frictional engagement with stone 16 in the course of grinding, the resultant inertia is such that spring 74 is unable to swing the lens holder toward the left. When the lens edge is completely ground so that it conforms with that of the former, then this frictional engagement is substantially reduced, at which point the strength of spring 74 is such that it acts to swing the lens holder toward the left. This effect is utilized to withdraw the lens from the grinding stone.

To this end, there is provided a disc-shaped stop or cam member 75 having a truncated conical edge, member 75 being mounted adjacent chuck 39 on spindle 37 to rotate therewith. When yoke 46 which carries the spindle is swung to the left as viewed in Fig. 3, member 75 strikes a vertically raised finger 76 whose end face is slanted in a plane parallel to the edge of member 75 whereby the member is caused to slide upwardly on the finger. Lens holder frame 44 is thereby raised to remove the ground lens from contact with stone 16. Thus a positive lift action is provided.

As shown in Fig. 8, the point at which the finger 76 is struck by the conical member is made adjustable. Finger 76 is integral with and perpendicular to one end of an arcuately shaped rod 77 whose other end is secured to a vertically mounted shaft 78 slidably mounted on a bushing 78ª attached to bed 10 (note Fig. 4). Rotation of shaft 78 is effected by means of a horizontally mounted shaft 79 on which there is secured a worm 80 which meshes with a gear 81 attached to shaft 78, the shaft 79 being turned by means of a handle 82. As handle 82 is turned in one direction, the finger 76 is brought closer to member 75 and when the direction of turn is reversed the finger is displaced away from member 75. In this way the extent to which the conical stop member 75 is lifted on finger 76 may readily be adjusted.

The operating procedure is as follows: At the outset the clutch 29 is disengaged by lever 28, and the spindles are disengaged by levers 65 and 70. The first step is to take a former of the desired shape and contour and to place it in chuck 39. By turning dial 50, the carriage 33 is then lowered on the column to a grinding position with respect to the stone. A lens to be ground is now inserted between the heads 35 and 36 and the knob 72 is turned until the lens is tightly held. Finger 76 is adjusted to a desired position for automatic withdrawal of the completed lens. The machine is ready for operation and the levers 28, 65 and 70 are shifted to set the grinding stone and the spindles into motion.

The bearings 42 and 43 are preferably bolted to bed 10 and the column 34 is similarly bolted to the bed, the same being true of the bracket 15 for motor 14. Thus the section 11 may readily be dismantled for purposes of shipping or repair. The other two sections are likewise supported on bed 10 by bolts, so that one has merely to detach the column for the lens holder and the bearings for the grinding stone in order entirely to dismantle the machine.

The structural details of the automatic bevel edge grinding section 13 are quite similar to that of section 11, save for the fact that no means are provided for withdrawing the lens from the stone upon completion of the grinding operation. Thus a column 83 is provided on which there is supported for elevational movement a carriage 84, the position of the carriage being adjusted by dial 85. Pivoted to carriage 84 so that it is swingable in the horizontal plane is a yoke 86 having downwardly extending side pieces 86ª and 86ᵇ. Pivotally coupled to side pieces 86ª and 86ᵇ are the two rearwardly extending arms of a vertically swingable frame 87, the pivotal connection between the arms and the side pieces being made by cross axle 88 on which there is centrally mounted a gear 89.

Motive power for the lens holder is transmitted by means of a sprocket wheel 90 secured to the shaft 25 of the bevel edge grinding stone 18 and linked by a continuous chain 91 to a sprocket wheel 92 on the end of a shaft 93 which is journaled in suitable bearings on carriage 84. Secured to shaft 93 is a gear 94 which meshes with gear 89, which in turn meshes with a gear 95 rotatably supported on a shaft 96 borne on frame 87. On either side of gear 95 is a worm, only the worm 97 being shown in Figs. 1 and 2. Mounted in suitable bearings on frame 87 are the spindles 98 and 99 in coaxial alignment, the spindles terminating in clamping heads 100 and 101', respectively for gripping a lens to be ground. At the other end of spindle 98 is a chuck 102 for the attachment of a former 103 which rides on a shoe 104 which is supported on a bracket 104ª connected to side piece 86ª of the yoke. The spindle 99 is axially shifted into clamping position by a threaded rod 105 which is rotated by knob 106.

Figure 2:
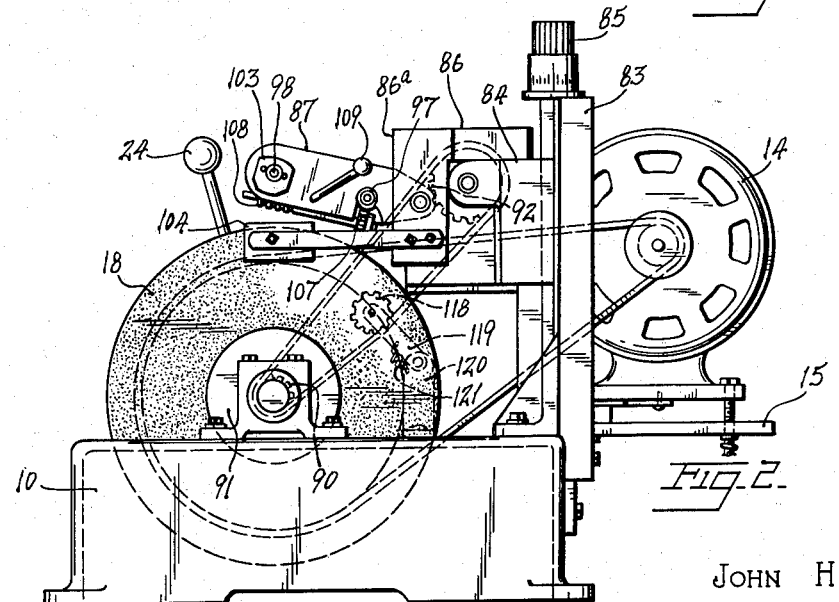
Fig. 2 is a side elevation as viewed from the right-hand side of the machine.

Inasmuch as carriage 84 may be raised or lowered, means are necessary to maintain the continuous chain 91 taut, so that it remains engaged with sprocket wheel 92. For this purpose there is provided, as best seen in Fig. 2, an idler sprocket wheel 118, rotatably mounted at the free end of an arm 119 whose other end is pivotally connected to an upright standard 120 mounted on the base of the machine. The idler wheel 118 engages the inner track of the lower strand of chain 91, the idler wheel being urged downwardly by means of a spring 121 connected between arm 119 and standard 120. Thus regardless of the vertical position of the carriage 84, the chain 91 is maintained in a taut condition to effect coupling between sprocket wheels 90 and 92. Similar means are supplied in conjunction with chain 53 on the flat edge grinding section of the machine, such means including, as shown in Fig. 1, a standard 122 and an arm 123 pivoted thereon.

As shown in Fig. 2, worm 97 engages a perpendicularly disposed gear 107 which drives a worm 108 meshing with a gear (not shown) secured to spindle 98. A lever 109 is adapted to effect disengagement between worm 108 and the spindle gear in a manner similar to that shown in connection with section 11. Spindle 99 is provided with a gear mechanism similar to that used in conjunction with spindle 98, hence the details thereof are omitted.

The operating procedure is along the lines disclosed in connection with section 11. The former 103 is first inserted in chuck 102, the carriage 84 is adjusted in height to effect contact between shoe 104 and former 103, and a lens is then clamped between heads 101 and 102.

Figure 9:
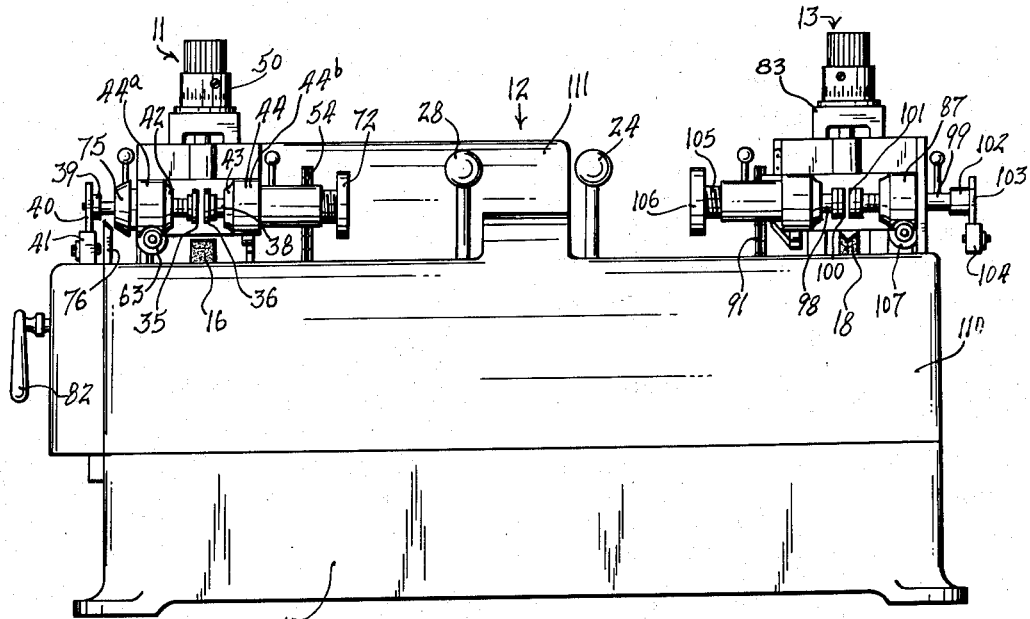
Fig. 9 is a front elevational view of the machine as it appears when surrounded with a protective shield.
Figure 10:
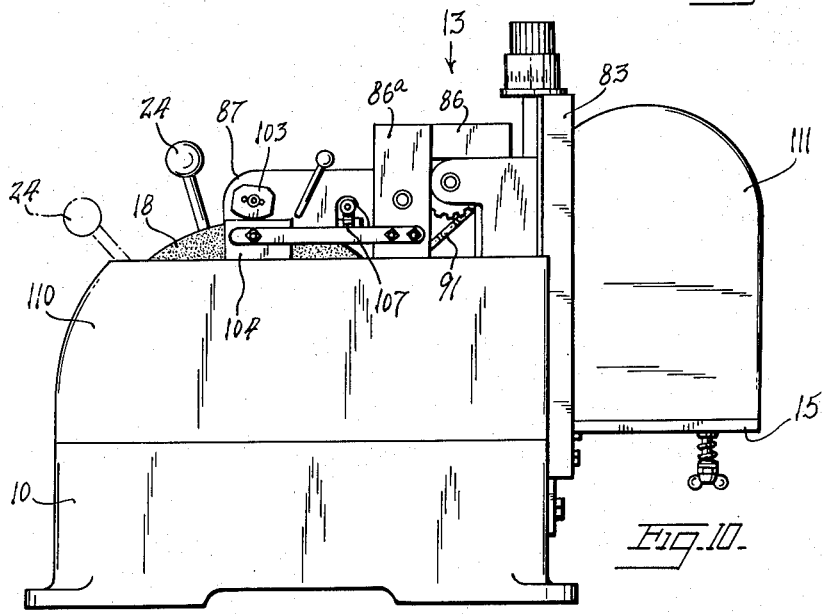
Fig. 10 is a side elevation as viewed from the right side of the shielded machine.

In Figs. 9 and 10, the machine is shown as completely assembled with a protective shield 110 surrounding the grinding wheels and all of the lens holding structure except for those portions which must be adjusted by the operator. A shield 111 is provided to protect the motor. It will be seen that the multipurpose machine in accordance with the invention has a well designed, compact appearance and is exceptionally simple to operate.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. Lens edge grinding apparatus comprising a rotatable grinding stone having a peripheral grinding a surface, a lens holding structure including a vertical supporting column, a carriage movably supported on said column and adjustable to a desired height relative to said stone, a yoke pivotally connected to said carriage for oscillation in the horizontal plane, a rocking frame pivotally coupled to said yoke for oscillation in the vertical plane, a spindle mounted for rotation on said frame and constituted by two axially aligned sections, a pair of clamping heads mounted on the inner ends of said sections, a former secured to the outer end of one of said sections and a gear train mounted on said lens holding structure for transmitting rotary motion to said spindle, a continuous chain belt for transmitting rotary motion to said gear train, means bearing on said belt to maintain same taut for any adjusted height of said carriage, and resilient means for normally maintaining said heads in axial alignment with said stone when said lens is pressed into frictional engagement therewith during a grinding operation and for shifting said heads out of alignment with said stone when said frictional engagement is substantially reduced.

2. Lens edge grinding apparatus comprising a supporting bed, a rotatable grinding stone having a peripheral grinding surface vertically mounted on said bed, a lens holding structure including a vertical column attached to said bed, a carriage movably supported on said column and adjustable to a desired height relative to said stone, yoke having its cross arm pivotally connected to said carriage for oscillation in the horizontal plane, a rocking frame pivotally coupled to said yoke for oscillation in the vertical plane, a shoe mounted on said carriage, a spindle mounted for rotation on said frame and constituted by two axially aligned sections, a pair of clamping heads mounted on the inner ends of said sections, a former secured to the outer end of one of said sections to contact said shoe, a gear train mounted on said lens holding structure for transmitting rotary motion to said spindle, and spring means connecting said frame to said carriage and having a tension normally maintaining said heads in alignment with said stone when said lens is pressed into frictional engagement therewith during a grinding operation and shifting said heads out of alignment with said stone when the pressure of said frictional engagement is substantially reduced.

3. Lens edge grinding apparatus comprising a supporting bed, a rotatable grinding stone having a peripheral grinding surface vertically mounted on said bed, a lens holding structure including a vertical column attached to said bed, a carriage movably supported on said column and adjustable to a desired height relative to said stone, a yoke having its cross arm pivotally connected to said carriage for oscillation in the horizontal plane, a rocking frame pivotally coupled to said yoke for oscillation in the vertical plane, a spindle mounted for rotation on said frame and constituted by two axially aligned sections, a pair of clamping heads mounted on the inner ends of said sections, a former secured to the outer end of one of said sections and a gear train mounted on said lens holding structure for transmitting rotary motion to said spindle, spring means connecting said frame to said carriage and having a tension normally maintaining said spindle in a position at which said heads are in axial alignment with said stone when said lens is pressed into frictional engagement therewith during a grinding operation and for shifting said heads out of alignment with said stone when the pressure of said frictional engagement is substantially reduced, a cam member secured to said spindle, and a fixedly and adjustably mounted finger positioned to engage said member when said spindle is shifted to one side to lift said frame.

4. Apparatus as set forth in claim 3 wherein said spring means including a first spring coupled between said frame and said carriage to urge said frame to one side of said carriage and second spring means coupled between said frame and said carriage to urge said frame to the other side, said two springs providing unequal tensions, the spring with the greater tension being adapted to exert pressure at the completion of the grinding operation.

5. Apparatus as set forth in claim 4 further including means to adjust the position of said finger relative to said cam member, said adjusting means including a rotatable shaft mounting said finger, a worm gear on said latter shaft, a manually rotatable shaft, and a worm on said latter shaft meshing with said worm gear.

6. In a lens edge beveling machine having a rotary disc-shaped grinding stone, a support for said stone, a motor for rotating said grinding stone, lens holding apparatus including a vertical supporting column, a carriage vertically movable on said column and being vertically adjustable relative to said stone, a yoke pivotally connected to said carriage for movement in a horizontal plane, a rocker frame pivotally supported on said yoke for movement in a vertical plane, a spindle mounted for rotation on said frame constituting two axially aligned sections, means for rotating said spindle, a pair of spaced clamping heads mounted on the inner opposed ends of said section, a master former fastened to the outer end of one of said sections, means for automatically moving the lens away from the grinding stone upon completion of the grinding operation, including a spring acting upon the yoke to one side of its center for swinging said yoke in one direction, a second spring acting upon the yoke at the other side thereof to move the yoke in the opposite direction, said second spring being stronger than said first spring, the frictional engagement between the lens and grinding stone normally preventing said second spring from effecting movement of the yoke, said engagement becoming released upon completion of the grinding operation on the lens, whereby said second spring moves said yoke, a tapered cam member carried by the spindle, a protruding portion having a tapered surface supported by the carriage in the path of movement of said cam member whereby a lifting action is imparted to said yoke carrying the spindle and said supported lens away from the grinding stone.

7. In a lens edge beveling machine having a rotary disc-shaped grinding stone, a support for said stone, a motor for rotating said grinding stone, lens holding apparatus including a vertical supporting column, a carriage vertically movable on said column and being vertically adjustable relative to said stone, a yoke pivotally connected to said carriage for movement in a horizontal plane, a rocker frame pivotally supported on said yoke for movement in a vertical plane, a spindle mounted for rotation on said frame constituting two axially aligned sections, means for rotating said spindle, a pair of spaced clamping heads mounted on the inner opposed ends of said section, a master former fastened to the outer end of one of said sections, means for automatically moving the lens away from the grinding stone upon completion of the grinding operation, including a spring acting upon the yoke to one side of its center for swinging said yoke in one direction, a second spring acting upon the yoke at the other side thereof to move the yoke in the opposite direction, said second spring being stronger than said first spring, the frictional engagement between the lens and grinding stone normally preventing said second spring from effecting movement of the yoke, said engagement becoming released upon completion of the grinding operation on the lens, whereby said second spring moves said yoke, a tapered cam member carried by the spindle, a finger having a tapered surface adjustably supported by the carriage in the path of movement of said cam member whereby a lifting action is imparted to said yoke carrying the spindle and said supported lens away from the grinding stone, and means for adjusting said finger including a rotatable shaft, means of connection between said shaft and finger, a worm gear fixed on said shaft, a rotatable shaft disposed at an angle to said first-named rotatable shaft, a worm on one end of said second-named shaft in mesh with the gear on the other shaft, and a handle on the other end of said second named shaft for rotating the same.

References Cited in the file of this patent

UNITED STATES PATENTS

| | | |
|---|---|---|
| 1,226,329 | Hansen | May 15, 1917 |
| 1,254,253 | Marchant | Jan. 22, 1918 |
| 1,489,606 | Long | Apr. 8, 1924 |
| 1,619,358 | Maynard | Mar. 1, 1927 |
| 1,659,964 | Schultz | Feb. 21, 1928 |
| 2,617,236 | Allen et al. | Nov. 11, 1952 |
| 2,651,890 | Rubinstein | Sept. 15, 1953 |